(12) United States Patent
Morone et al.

(10) Patent No.: US 8,607,953 B2
(45) Date of Patent: Dec. 17, 2013

(54) CLUTCH WITH CLEARANCE RECOVERY DEVICES

(75) Inventors: Alfio Morone, Milan (IT); Roberto Morone, Milan (IT)

(73) Assignee: Adler S.p.A., Rovereto (Trento) (IT)

(*) Notice: Subject to any disclaimer, the term of this patent is extended or adjusted under 35 U.S.C. 154(b) by 401 days.

(21) Appl. No.: 12/904,069

(22) Filed: Oct. 13, 2010

(65) Prior Publication Data

US 2011/0083934 A1 Apr. 14, 2011

(30) Foreign Application Priority Data

Oct. 14, 2009 (EP) ...................................... 09425405

(51) Int. Cl.
*F16D 13/75* (2006.01)
*F16D 43/12* (2006.01)

(52) U.S. Cl.
USPC .............. 192/70.252; 192/105 C; 192/111.16

(58) Field of Classification Search
USPC ................. 192/105 C, 103 A, 70.252, 111.16, 192/111.4, 83
See application file for complete search history.

(56) References Cited

U.S. PATENT DOCUMENTS

| | | | | |
|---|---|---|---|---|
| 1,553,101 A | | 9/1925 | Osborn | |
| 1,560,267 A | * | 11/1925 | Lippincott | ................ 192/105 C |
| 1,743,170 A | * | 1/1930 | Vail | ............................ 192/105 C |
| 2,090,265 A | * | 8/1937 | Padgett | ........................ 192/70.13 |
| 5,325,949 A | * | 7/1994 | Dommett et al. | ......... 192/70.252 |
| 5,361,882 A | * | 11/1994 | Tipton | ......................... 192/70.24 |
| 5,423,406 A | * | 6/1995 | Antonov | .................... 192/103 A |
| 6,079,537 A | * | 6/2000 | Hofmann et al. | ......... 192/70.252 |
| 2004/0262119 A1 | | 12/2004 | Weidinger et al. | |
| 2007/0125617 A1 | | 6/2007 | Gochenour | |

FOREIGN PATENT DOCUMENTS

WO 2005083284 A1 9/2005

OTHER PUBLICATIONS

European Search Report for European Patent Application No. 09425405.9, dated Mar. 19, 2010.

* cited by examiner

*Primary Examiner* — Richard M. Lorence
*Assistant Examiner* — Lillian Nguyen
(74) *Attorney, Agent, or Firm* — Patterson & Sheridan, LLP

(57) ABSTRACT

A clutch adapted to transmit the motion from a driving shaft to a driven shaft, having an axis of rotation coaxial to the driven shaft and comprising, a ring gear, a first bell integral in rotation with the ring gear and coaxial to the axis of rotation, an axially fixed hub internal to the first bell and coaxial to the axis of rotation, an axially movable pressure assembly including a disk-pusher element, a disk pack, a plurality of elastic elements, and a centrifugal assembly. The clutch comprises at least one first clearance-recovery device of a unidirectional type, adapted to limit the separation of the disk-pusher element from the axially fixed hub and from the disk pack, and a second clearance-recovery device of a unidirectional type, adapted to enable an axial movement of the centrifugal assembly only towards the disk-pusher element.

15 Claims, 14 Drawing Sheets

CLUTCH WITH CLEARANCE RECOVERY DEVICES

CROSS-REFERENCE TO RELATED APPLICATIONS

This application claims benefit of European patent application number 09425405.9, filed Oct. 14, 2009, which is herein incorporated by reference.

BACKGROUND OF THE INVENTION

1. Field of the Invention

The present invention is directed to a clutch with clearance-recovery devices. In particular, the invention has been developed with reference to a clutch with an automatic-engagement device, provided at the same time with a manual operation device, having recovery devices for the clearances related to wear during the operation of the clutch or else to the machining tolerances of the components at the moment of the assembly of the clutch itself.

2. Description of the Related Art

It is known, in the field of the transmission of motion, the use of multi-disk clutches either of the dry type or of the oil-bath type. This type of clutches in general has a disk pack in which driving disks, integral in rotation with a component of the clutch, typically a bell, which receives motion from a crankshaft connected to the engine of a motor vehicle on which the clutch is installed, and driven disks, integral in rotation with a component of the clutch, typically a hub, which transmits the motion to a driven shaft, typically the primary one of a gear-change, are alternated. The driven disks and the driving disks are made of metal material and the ones or the others, alternatively, are coated with friction material. Finally there are, as it is known, mobile components, in general axially movable, that ensure the engagement of the clutch by compressing the disk pack.

It is known that during use of the clutch the disks are subject to wear due to the relative sliding, in particular during the transients of engagement and disengagement and in situations in which the clutch works as torque-limiting member.

This evidently causes a thinning-out of the friction material present on the disks, and consequently causes a reduction of the total thickness of the disk pack.

This has evidently direct effects on operation of the clutch, both in the case of manually operated clutches, and above all in the case of automatically operated clutches, generally of a centrifugal type. In particular, with the advance of the wear and consequent thinning-out of the disk pack there is in general a variation in the strokes of the mobile components of the clutch of an automatic type that generates altered responses to the inputs of the driver and has a negative effect on the drivability and on the dynamics of the vehicle.

It is likewise known that at the time of the assembly of a clutch it is possible to encounter the presence of clearances caused by deviations of the dimensions of the components themselves with respect to the nominal values in accordance with the tolerances prescribed in the design stage. Also the variation of the clearances of the components causes variation of the strokes of the mobile components of the clutch of an automatic type. This has particular importance in the field of automatically engaged clutches and calls in general for long and economically significant interventions, as will be described hereinafter.

The above-mentioned problems are of particular importance in the field of two-wheeled motor vehicles, in which the characteristics of drivability of a vehicle, as well as the responses thereof to the inputs of the driver, are extremely important both for the performance of the motor vehicle, and for the safety and comfort of the ride.

In particular, in the case of manual control of an automatic clutch, a driver who operates a control lever for performing the normal operations of gear-change or starting from standstill perceives a difference in the response of the clutch due to the wear or to the different assembly clearances thereof, which clearly penalises the drivability of the motorcycle itself.

In the case of automatically operated clutches, in particular of a centrifugal type, the stroke of the mobile components that perform the engagement is proportional to the engine speed of rotation; hence it is evident that in order to engage the clutch it is necessary to reach a higher speed of rotation as the wear increase or for higher values of the assembly clearances, with a strong impact on the characteristics of drivability of the vehicle itself. In addition, also for low values of wear a failure in operation of the clutch itself could occur.

The solutions available in the context of the prior art for automatic clutches envisage in general the insertion of disks of different thicknesses in the disk pack both at the time of assembly and during the use of the clutch to compensate for the wear thereof or the clearances due to the dimensional tolerances. However, installation of the aforesaid disks inevitably entails having to disassemble the clutch. Evidently this is far from convenient and above all it is an intervention that is carried out when the clutch has already in part changed its response to the inputs imparted by the driver of the vehicle; hence, it is not an action that is automatic and transparent to the driver.

The object of the invention is to overcome the problems of the prior art. In particular, the object of the invention is to provide a clutch of an automatic type that is able to maintain characteristics of drivability and of response to the inputs of the driver of the vehicle substantially unchanged with the advance of the wear of the disk pack or owing to the presence of different assembly clearances, compensating in an automatic and way transparent to the driver for the variations in operation due to wear of the disk pack and to the dimensional tolerances of the components.

SUMMARY OF THE INVENTION

The object of the invention is achieved by a clutch having the characteristics forming the subject of the ensuing claims, which form an integral part of the technical teaching herein provided in relation to the invention. In particular, the object is achieved by a clutch, in particular of a multi-disk, automatically and manually operated type, comprising a first clearance-recovery device and a second clearance-recovery device of the unidirectional type, co-operating, respectively, with a mobile element that compresses the disk pack axially and with an engagement centrifugal assembly.

BRIEF DESCRIPTION OF THE DRAWINGS

The invention will now be described with reference to the attached drawings, which are provided purely by way of non-limiting example and wherein.

DETAILED DESCRIPTION

Figure 1:
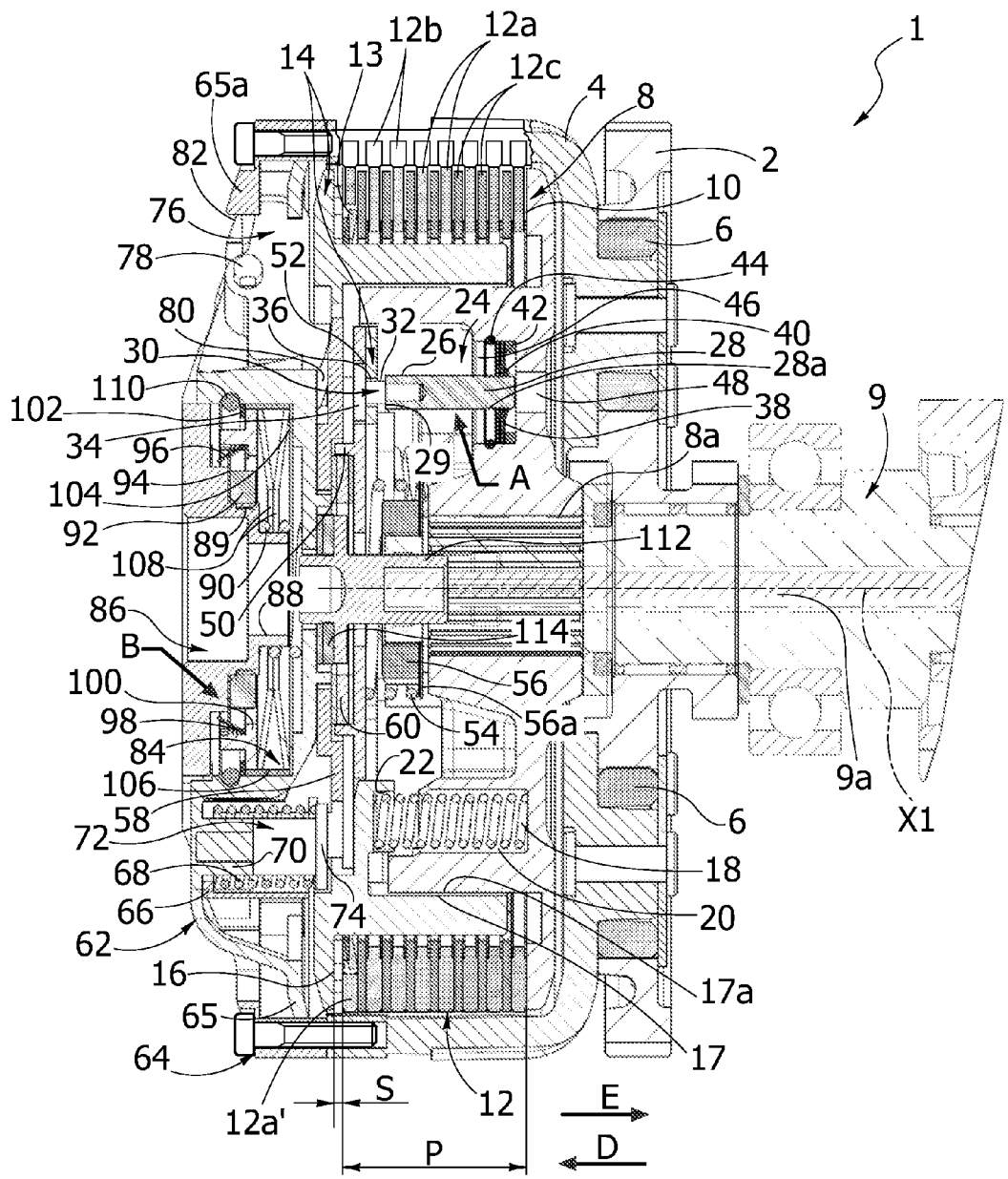
FIGS. 1 and 2 are views in longitudinal section of a clutch, according to a first embodiment of the invention, in conditions of zero wear and assembled with components manufactured with nominal dimensions, said figures illustrating part of a sequence of automatic clutch engagement.

Designated by 1 in FIG. 1 is a clutch according to a first embodiment of the invention. The clutch 1 has an axis of rotation X1 that in this embodiment is parallel to a driving shaft (not illustrated).

The clutch 1 comprises a ring gear 2, designed to receive motion from the aforesaid driving shaft, which is connected to an engine of a vehicle on which the clutch 1 is installed. The ring gear 2 is made integral in rotation with respect to a first bell 4 by means of a plurality of anti-jerk annular elements 6 made of elastomeric material. The ring gear 2 and the bell 4 are coaxial to the axis of rotation X1 of the clutch 1.

Positioned inside the bell 4 is a first hub 8, axially fixed, coaxial to the axis X1. The hub 8 is intended to be connected in rotation by means of a splined profile 8a to a driven shaft 9, coaxial to the axis X1 and represented with phantom line, forming part of a gearbox of the vehicle (not illustrated). The shaft 9 is hollow and houses an axially movable control rod 9a, as will be described in detail hereinafter. The hub 8 is axially supported by an axial bearing 8b and a collar 8c and comprises a first abutment surface 10, which is in contact with a disk pack 12, coaxial to the axis X1, and having, in conditions of zero wear or when assembled with components manufactured with nominal dimensions (as illustrated in FIGS. 1 to 6), an overall thickness equal to P.

The disk pack 12 comprises a plurality of driving disks 12a, integral in rotation with respect to the bell 4 by means of respective external toothings 12b and provided each with a plurality of circular sectors made of friction material (not visible), and alternate with a plurality of driven disks 12c integral in rotation, by means of respective internal toothings, with a second hub 14 axially movable in an engagement direction E and a disengagement direction D, which are parallel and opposite to one another. The disk pack 12 is comprised between the first, axially fixed, hub 8 and the second, axially movable, hub 14 and is kept in contact with the surface 10. In the disk pack 12, there is moreover inserted a driving disk 12a', which is also integral in rotation with respect to the bell 4, having an oversized internal diameter for housing a disc spring 13.

The hub 14 is coaxial to the axis X1 and comprises a compression surface 16, designed to co-operate with the disk pack 12, as will be described in detail hereinafter. The hub 14 hence provides a disk-pusher element of the clutch 1.

The hub 14 is axially fitted on the hub 8 by means of a plurality of helical coupling profiles 17 co-operating with corresponding coupling profiles 17a, which is also helical, provided on the axially fixed hub 8. In this way, the hub 14 and the hub 8 are integral in rotation, but the hub 14 can move axially with respect to the hub 8, with a motion of rototranslation imposed by the helical profiles 17, 17a.

A plurality of elastic elements 18, housed in coaxial seats 20, 22 provided, respectively, in the hub 8 and in the hub 14, is designed to cause an axial separation of the axially movable hub 14 from the axially fixed hub 8 and from the disk pack 12. In the embodiment illustrated herein, the clutch 1 comprises three elastic elements 18, in particular in the form of cylindrical-helix springs, with even angular spacing.

Moreover housed between the hub 8 and the hub 14 is at least one first clearance-recovery device 24. In the embodiment illustrated herein, the clutch 1 comprises three devices 24 with even angular spacing around the axis X1 and alternated with respect to the elastic elements 18.

Figure 1A:
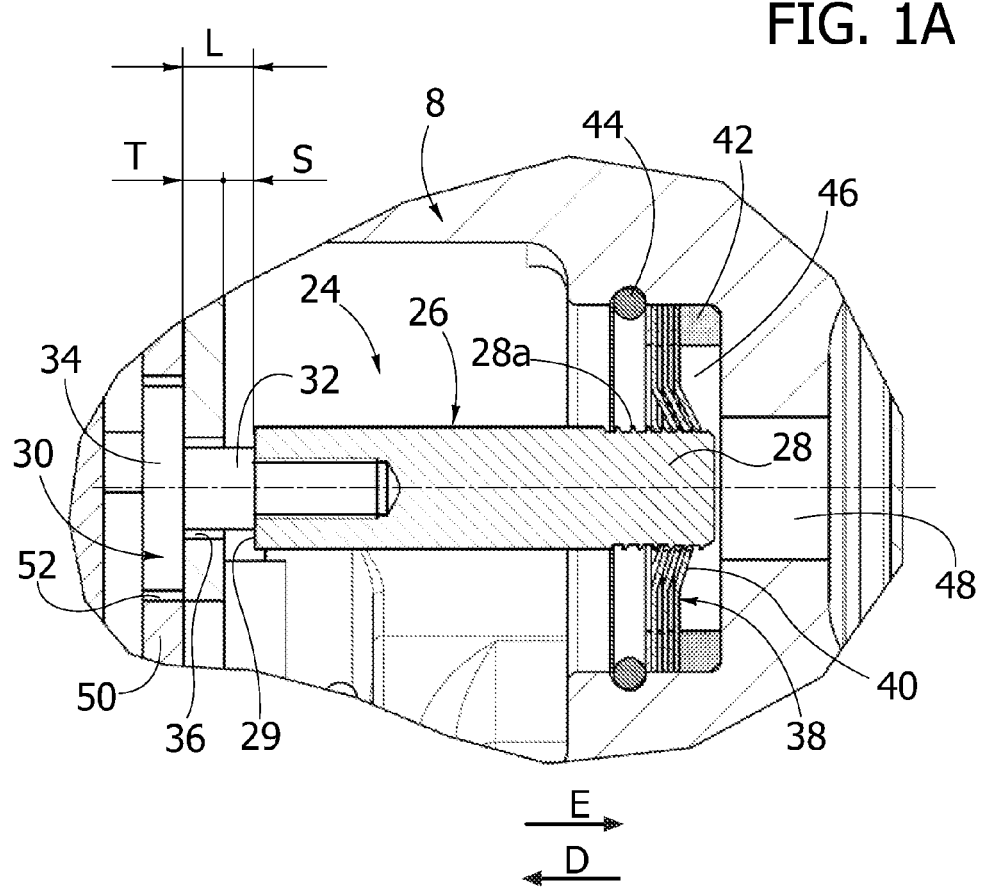
FIGS. 1A, 1B are enlarged views of details indicated, respectively, by the arrows A and B in FIG. 1.

With reference to FIGS. 1, 1A, each device 24 comprises a first pin 26, of cylindrical shape, having a first end 28 provided with annular projections 28a that in this embodiment have a sawtooth profile. On a second end 29 of the pin 26 there is installed, coaxial and integral to the pin 26, a second pin 30, which is also cylindrical. The pin 30 comprises a neck 32 having a smaller diameter than that of the pin 26 and immediately adjacent thereto, and a cylindrical head 34 having a markedly larger diameter than that of the neck 32. In the embodiment illustrated herein, the pin 30 is screwed within the pin 26 and is coaxial thereto. The head 34 and the end 29 of the pin 26 provide two abutment surfaces for the hub 14, as will be described in detail hereinafter.

Each neck 32 is inserted, generally with play, within a corresponding hole 36 provided in a portion of reduced thickness of the hub 14. The hub 14 is kept in contact with the heads 34 by the action of the elastic elements 18.

Each neck 32 has a length L sized in such a way that, designating by T the thickness of the portion of the hub 14 in which the hole 36 is provided, the difference between L and T is equal to S, i.e., the nominal engagement stroke of the hub 14, which substantially corresponds to the axial distance between the disk pack 12 and the hub 14 in conditions of disengaged clutch and zero wear of the disk pack 12 and/or, for what has been previously described, of zero assembly clearance of the components that are thus manufactured with nominal dimensions. Hence, the length L of each neck 32 is substantially equal to the sum T plus S.

S is thus a reference value for the clutch 1. In the following, where it is not associated to the letter S, by the term "engagement stroke" it is meant to designate generically the axial distance between the hub 14 and the disk pack 12 in conditions of disengaged clutch.

Finally, the device 24 comprises a pack of annular laminas 38 coaxial to the pins 26, 30 and each having at least one bent-back lip 40. The annular laminas 38 are kept axially fixed, in a way in itself known, by means of a spacer ring 42 and an elastic ring 44. The laminas 38 and the rings 42, 44 are housed in a seat 46 provided in the hub 8 and associated to a channel 48 coaxial with the pin 26. Each lip 40 is bent towards a corresponding channel 48.

The end 28 of the pin 26 is inserted within the laminas 38, and the annular projections 28a provided thereon co-operate with the bent-back lips 40.

In particular, the shape and orientation of the annular projections 28a are such that they offer to the bent-back lips 40 a substantially ramp-like profile in the case where the pin 26 has a relative motion in the direction E with respect to the lips 40, enabling the aforesaid relative motion. In the case where the relative motion is in the direction D, the annular projections 28a substantially offer a shoulder to the lips 40, which inhibits the relative motion.

The device 24 provides in this way a unidirectional linear ratchet-and-pawl mechanism in which the pins 26 and 30 are able to move axially only in the direction E, as will be described hereinafter.

The hub 14 is moreover constrained, by means of each of the aforesaid portions of reduced thickness, in which a respective neck 32 of a pin 30 is inserted, to an axial movement limited by abutment surfaces provided by the heads 34 of the pins 30 and by the ends 29 of the pins 26.

The clutch 1 moreover comprises a first pressure ring 50, coaxial to the axis X1 and axially co-operating with the hub 14, with which it is integral in rotation and with which it is axially in contact in certain operating conditions. The pressure ring 50 is fitted by means of holes 52 on the heads 34 of the pins 30 of the devices 24. The holes 52 are provided generally so as to enable fitting with play on the heads 34.

The first pressure ring 50 is axially countered by an elastic element 54, particularly in the form of cylindrical-helix spring, which is coaxial to the axis X1 and axially supported by a flange 56a. The flange 56a is fitted on the driven shaft 9 and is axially blocked thereon by means of a threaded ringnut 56.

A second pressure ring 58 coaxial to the axis X1 co-operates axially with the first pressure ring 50 by means of an axial bearing 60 of a known type. The first and second pressure rings 50, 58 are hence not in direct contact with one another.

The clutch 1 hence comprises an axially movable pressure assembly, which includes, in this embodiment, the axially movable hub 14, the first and second pressure rings 50, 58, and the axial bearing 60. As has been described previously, the axially movable hub 14 provides a disk-pusher element of said pressure assembly.

The second pressure ring 58 is integral in rotation with respect to a mass carrier 62, which is coaxial to the axis X1 and is in turn integral in rotation with a second bell 64 in which it is inserted via a centring diameter 65. In particular, the mass carrier 62 is integral in rotation with the bell 64 by means of projections 65a that engage with corresponding mating profiles on the bell 64, whilst it is axially mobile with respect thereto.

The second bell 64 is coaxial to the axis X1 and is integral in rotation with the first bell 4 by means of screws of a known type. Hence the mass carrier 62 and the bells 64, 4 are integral in rotation with the ring gear 2, which receives motion from the engine of the vehicle.

The second pressure ring 58 comprises a plurality of through axial seats 66 provided therein. Each through axial seat 66 houses a respective elastic element 68, here in the form of a cylindrical-helix spring, which is fitted on an axial boss 70, which traverses the corresponding seat 66 and is inserted therein, integral with the mass carrier 62. Screwed in each boss 70 is a respective pin 72 having a radially protruding head 74.

Each elastic element 68 is comprised between a bottom of the seat 66 and the head 74 of a corresponding pin 72. Each elastic element 68 is adapted to keep the second pressure ring 58 axially in contact with the mass carrier 62 via centrifugal masses 76.

The mass carrier 62 comprises a plurality of centrifugal masses 76, arranged about the axis X1, rotatable around respective pins 78 having substantially transverse orientation with respect to the axis X1.

The mass carrier 62 and the centrifugal masses 76 rotatably coupled therewith form a centrifugal assembly of the clutch 1. Hence, the centrifugal assembly, by means of the mass carrier 62, is integral in rotation with the second bell 64 and is coaxial to the axis X1.

It will moreover be appreciated that by means of the bosses 70, the seats 66, and the elastic elements 68, the second pressure ring 58 is integral in rotation with the mass carrier 62, and hence to the centrifugal assembly.

The centrifugal assembly of the clutch 1 co-operates axially with the pressure assembly of the clutch 1, in particular with the second pressure ring 58, by means of the centrifugal masses 76, to cause an axial compression of the disk pack 12. Each centrifugal mass 76 comprises a foot 80, designed to exert an axial thrust on the second pressure ring 58 and is moreover limited in its rotation by an end point boss 82 integral with the mass carrier 62.

The mass carrier 62 moreover comprises a circular seat 84 coaxial to the axis X1, wherein it is housed a hub 86 of the second bell 64, integral therewith and axially fixed. The hub 86 comprises a first collar 88 and a second collar 89. On the first collar 88 fits an elastic element 90, in particular in the form of a cylindrical-helix spring, which co-operates axially with the mass carrier 62. In detail, the elastic element 90, which has a preload that is considerably higher than the preload of the elastic element 54, is adapted to move the centrifugal assembly, in particular the mass carrier 62, axially away from the hub 86 in the direction E, pushing it axially towards the pressure assembly.

Figure 1B:
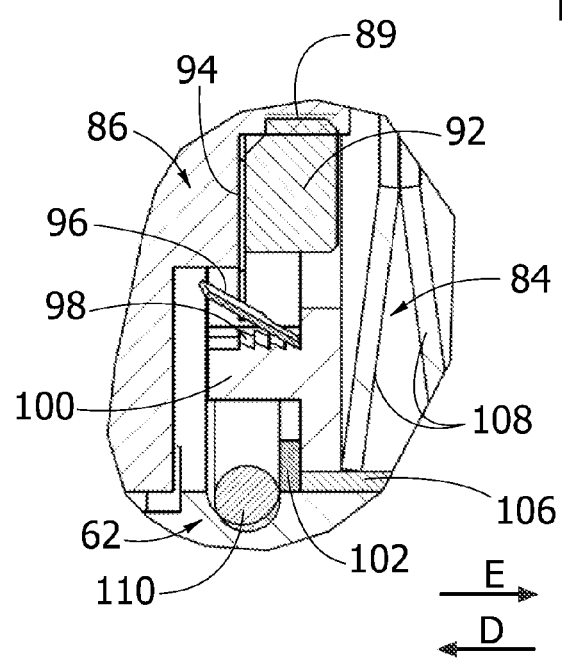

With reference to FIGS. 1 and 1B, screwed on the second collar 89, which is threaded, is a threaded ringnut 92 that axially blocks a washer 94 on the hub 86. The washer 94 comprises a plurality of bent-back lips 96, which are adapted to co-operate with corresponding annular projections 98, illustrated herein with a sawtooth profile, provided on a collar 100. The ways in which the annular projections 98 of the collar 100 co-operate with the lips 96 are identical, respectively, to the ways in which the annular projections 28a of the pin 26 co-operate with the lips 40.

A first and a second disks 102, 104, which have a substantially planar development, and a ring 106, which has a substantially axial development and is set between them, are housed in the circular seat 84 of the mass carrier 62 and define an annular structure that axially comprises the collar 100 and a pair of disc springs 108 mounted in opposition. The springs 108 axially counter the collar 100. An elastic ring 110 axially blocks the aforesaid annular structure, defined by the first and second disks 102, 104 and by the ring 106, in the circular seat 84.

The collar 100, the washer 94, the ringnut 92, and the elastic element 90 define a second clearance-recovery device of a unidirectional type. Like the first device 24, the second clearance-recovery device is a unidirectional linear ratchet-and-pawl mechanism.

Finally, the clutch 1 comprises a control element 112 axially co-operating with the mass carrier 62 by means of an axial bearing 114 and coupled with the axially movable control rod 9a within the shaft 9. The control rod 9a moreover axially supports the control element 112.

The operation of the clutch 1 is described in the following.

The clutch 1 is in general designed to transmit the motion from the driving shaft of the engine of the vehicle (not illustrated) to the driven shaft 9.

Figure 2:
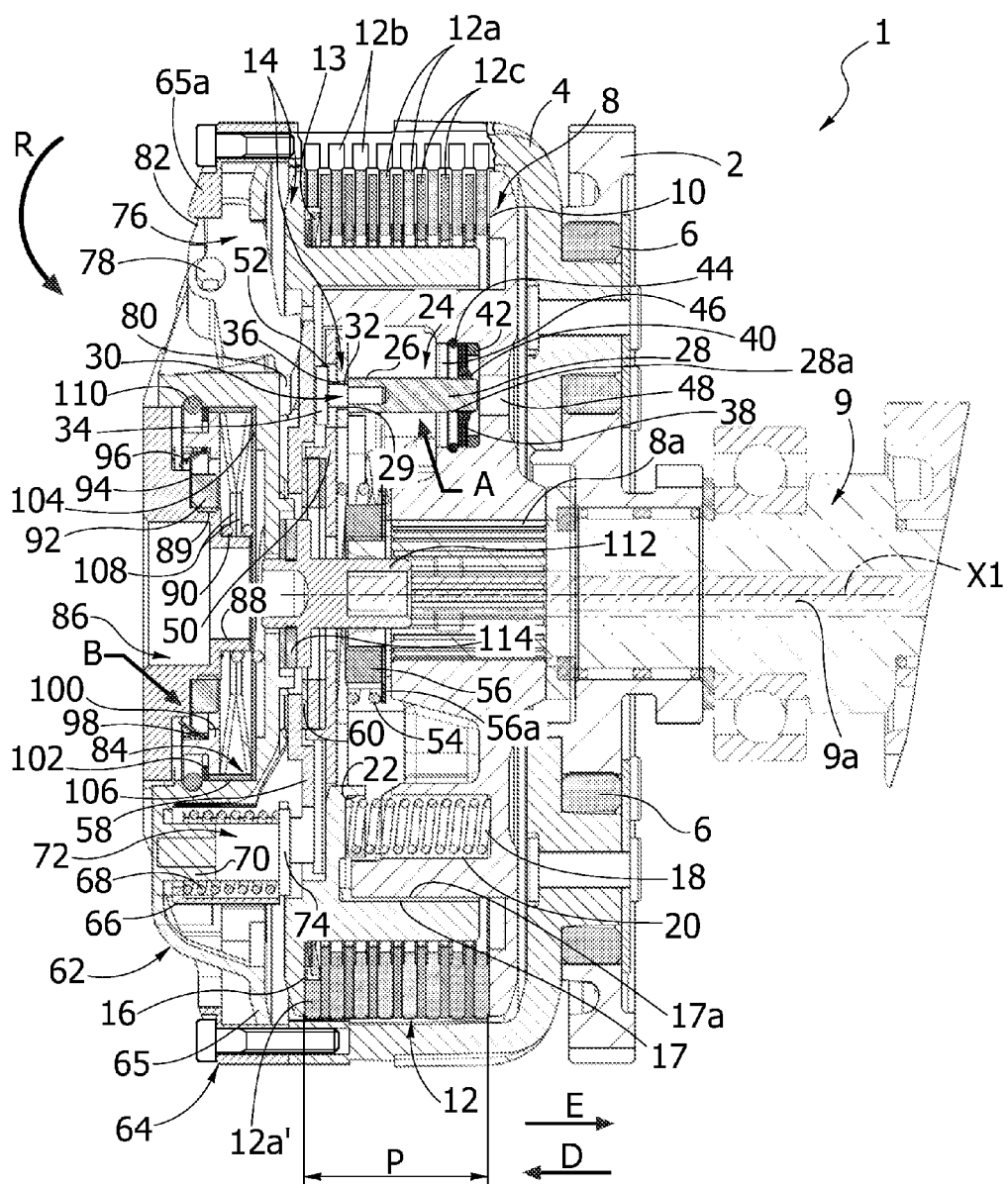

The subsequent FIGS. 1, 2 illustrate part of a sequence of automatic engagement.

Illustrated in FIGS. 1, 1A, 1B, is the clutch 1 in standby conditions. This corresponds to a situation in which the engine of the vehicle is not rotating or is idling or, as will be described hereinafter, is rotating at a speed lower than an engagement threshold of the clutch 1.

FIGS. 1, 1A, 1B and the subsequent FIGS. 2-6 refer to a condition of zero wear or practically zero wear of the disk pack 12. From what has been described previously regarding the dimensional tolerances of the components, FIGS. 1, 1A, 1B can equally refer, like the subsequent FIGS. 2-6, to a condition in which the components have been manufactured with centred tolerances and hence substantially with nominal dimensions.

The corresponding positions of the clearance-recovery devices are illustrated in FIGS. 1A and 1B.

If the engine is rotating, the ring gear 2, the first and second bells 4, 64, the driving disks 12a, the centrifugal assembly, and the second pressure ring 58 are driven in rotation around the axis X1. Also the second clearance-recovery device is driven in rotation around the axis X1.

The remaining components, including the hubs 14, 8, do not turn, and the axial bearings 60, 114 enable, respectively, relative rotation of the second pressure ring 58 with respect to the first pressure ring 50 and of the centrifugal assembly with respect to the control element 112.

In standby conditions, the hub 14 and the hub 8 do not axially compress the disk pack 12 since they are kept separated by the action of the elastic elements 18. Consequently, in the case where the engine of the motor vehicle is rotating at the above indicated speeds, no torque is transmitted to the driven shaft 9. In this condition, the first pressure ring 50 is kept in contact with the axially movable hub 14 by means of the elastic element 90.

In order to cause the engagement of the clutch 1 starting from the condition described previously, it is necessary to increase the speed of rotation of the vehicle engine by acting on the accelerator control.

In this way, with reference to FIG. 2, the centrifugal masses 76 perform a rotation that in FIG. 2 is in a counterclockwise direction, indicated by an arrow R, or more in general such that the foot 80 of each mass 76 pushes the pressure assembly in the direction of engagement E, hence towards the disk pack 12.

In particular, the rotation of the centrifugal masses 76, thanks to the feet 80, pushes, in the direction E, the second pressure ring 58, which is provided with a profile adapted for receiving an axial thrust from the centrifugal masses 76, which by means of the axial bearing 60 transmits the thrust to the first pressure ring 50. The first pressure ring 50 then transfers the axial thrust to the axially movable hub 14.

In this way, the distance S between the hub 14 and the disk pack 12 is progressively nullified, and the clearance existing between the driving disks and the driven disks is likewise eliminated, causing contact between the pressure surface 16 and the disk pack 12 itself. Hence the disk pack is compressed by means of the axially movable hub 14, thus enabling the transmission of torque by friction to the shaft 9. Clearly, in said conditions also the components that in standby conditions do not rotate are driven in rotation about the axis X1 due to the transmission of forces with axial direction between driving disks 12a, 12a' and driven disks 12c, which generate tangential forces of friction that are able to transmit torque.

In particular, in order to achieve a condition of start of engagement of the clutch 1, the action of the centrifugal masses 76 on the pressure assembly must overcome the combined action of: the elastic elements 68, which are designed to keep the pressure ring 58 and the masses 76 of the mass carrier 62 in contact with one another and are thus designed to produce an action of elastic return of the pressure ring 58 towards the mass carrier 62; the elastic elements 18, which are adapted to separate the hub 14 from the hub 8; and the elastic element 54, which is adapted to keep the pressure ring 50 in contact with the bearing 60. The action of the elastic element 90, instead, adds to the action of the centrifugal masses 76. The elastic elements 54 and 90 substantially have no effect for the purposes of start of engagement of the clutch 1 due to the very low values of preload as compared to those of the other elastic elements 18 and 68.

Evidently, said condition is achieved only in the presence of a sufficiently high centrifugal force such as to substantially overcome the return forces of the elastic elements 68 and 18, hence only if the engine of the vehicle, which transmits the rotational motion to the clutch 1, in particular to the centrifugal assembly, rotates at a speed higher than a threshold value, as previously mentioned. Purely by way of non-limiting example, a threshold value typical for the clutch illustrated herein, expressed as speed of rotation of the engine of vehicle on which the clutch 1 is installed, is of approximately 4000 r.p.m.

With the increase of the engine speed, after the step of engagement of the clutch has started, there is also an increase in the value of the axial forces generated by the masses 76, which continue their rotation around the pin 78, on the pressure assembly, and on the disk pack 12; hence, the value of the torque transmitted by the clutch 1 increases.

The torque transmitted by the crankshaft (not illustrated) to the ring gear 2 and to the bell 4 as a result of the axial forces generated by the masses 76 is transmitted to the driving disks 12a, 12a', and from these to the driven disks 12c and to the hubs 8, 14.

Hence, the torque is transmitted to the shaft 9 through the splined profile 8a.

The coupling with helical teeth between the hub 14 and the hub 8 produces an additional axial force that tends to compress the disk pack 12 and that is proportional, in a way in itself known, to the torque applied to the clutch 1. The use of helical profiles to obtain a so-called effect of "power torque" in multi-disk clutches is a concept in itself known and forms the subject of the European patent No. EP 1 058 018, filed in the name of the same applicant.

Figure 2A:
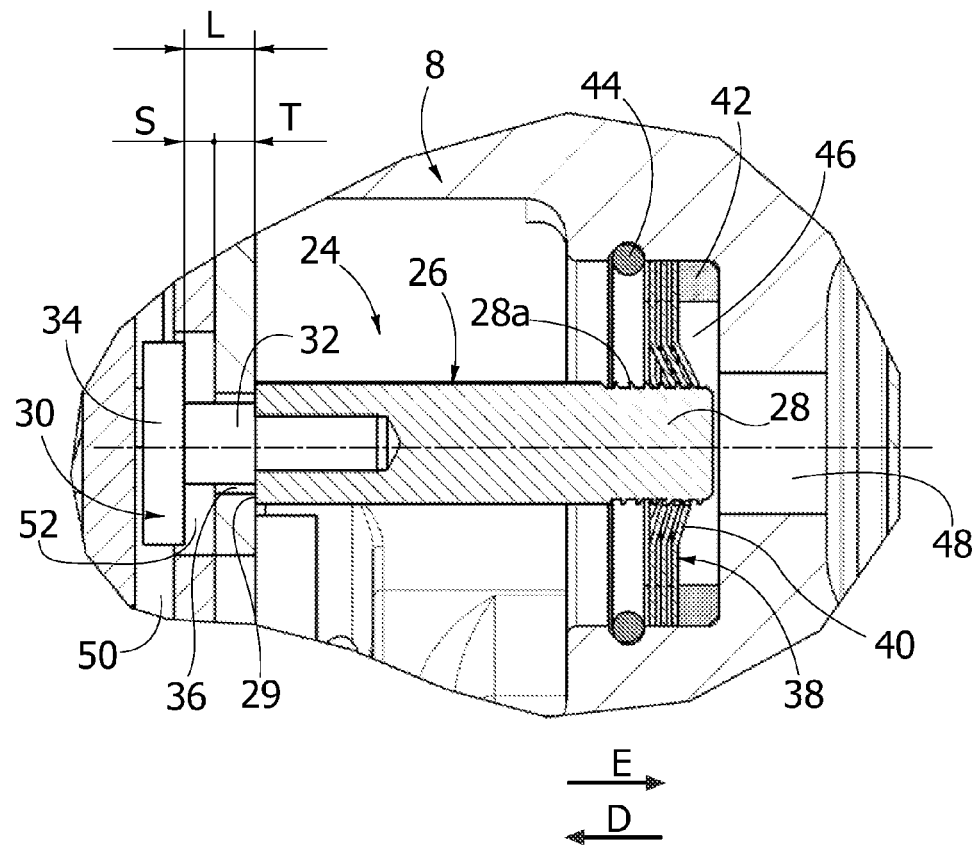
FIGS. 2A, 2B correspond to FIGS. 1A, 1B but refer to FIG. 2.
Figure 2B:
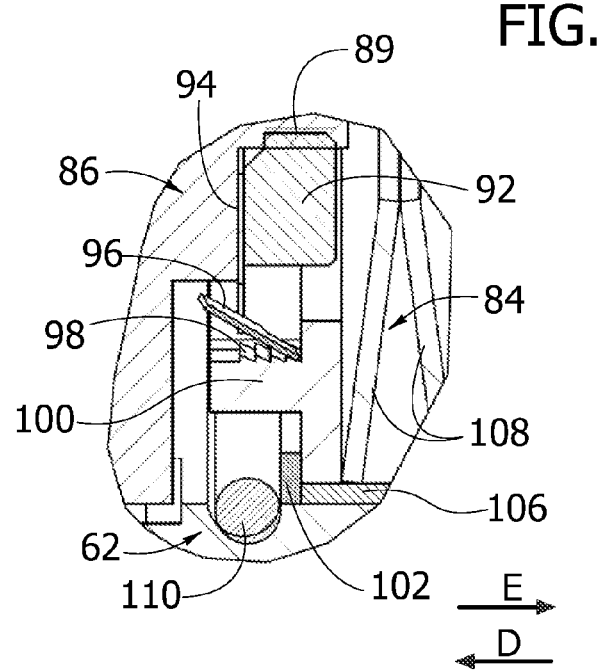

In FIGS. 2A, 2B there are illustrated, respectively, the first and second clearance-recovery devices in conditions corresponding to FIG. 2. Note that no relative displacement has occurred between the collar 100 and the washer 94 and between the pin 26 and the pack of annular laminas 38 following upon an operation of automatic engagement. At the same time, as may be seen in FIG. 2A, the hub 14 and the first pressure ring 50 have advanced axially in the direction E by a length equal to S (nominal engagement stroke), and the hub 14 is now in contact with the end 29 of the pin 26.

The centrifugal assembly and all the components integral therewith or contained therein do not undergo substantially any axial displacement during the step of automatic engagement of the clutch 1 described previously. The axial reaction on the pins 78 due to the action of the feet 80 on the pressure assembly is discharged by means of the elastic elements 108 on the lips 96 of the washer 94 via the annular profiles 98 of the collar 100, and is then discharged on the hub 86 of the second bell 64. Furthermore, during the engagement step or for higher speeds than that of the engagement step, each centrifugal mass 76 is still able to rotate around the respective pin 78 until it comes into contact with the corresponding end point boss 82 (see, for example FIG. 5). The latter condition, which depends upon the engine speed, would correspond to a further axial displacement in the direction E imposed to the mobile hub 14, which exceeds the value of the nominal engagement stroke S. Since in conditions of practically zero wear of the disk pack 12 and of components with centred dimensional tolerances the hub 14 can move axially in the direction E by a distance at most equal to S, it is evident that the difference of displacement must be compensated for by another axially movable component, in particular the mass carrier 62.

The translation of the mass carrier 62, in particular in the direction D, is possible due to an axial compression of the disc springs 108.

The springs 108 are mounted between the disk 104 and the collar 100, which is fixed in axial translation in the direction D due to the coupling between the lips 96 of the washer 94 and the annular projections 98 of the collar 100, and are mounted pre-loaded at a well defined value of loading that is described hereinafter.

The mass carrier 62 is able to slide axially in the direction D with respect to the collar 100, thus enabling compression of the disc springs 108.

The ring 106 is axially slideable with respect to the collar 100, which is fixed in axial translation in the direction D; hence, if the mass carrier 62 is pushed in the direction D, the aforesaid annular structure, defined by the disks 102, 104 and by the ring 106, which integral with the mass carrier 62 due to the elastic ring 110, translates with the mass carrier, with consequent compression of the springs 108.

The disc springs 108 moreover limit the maximum value of torque transmissible by the clutch 1 since the disk pack 12 is in this way subjected to the action of a maximum axial force that is limited by the preload value of the springs 108. This prevents any overloading that might damage the gearbox of the vehicle and the entire drive train.

Figure 3:
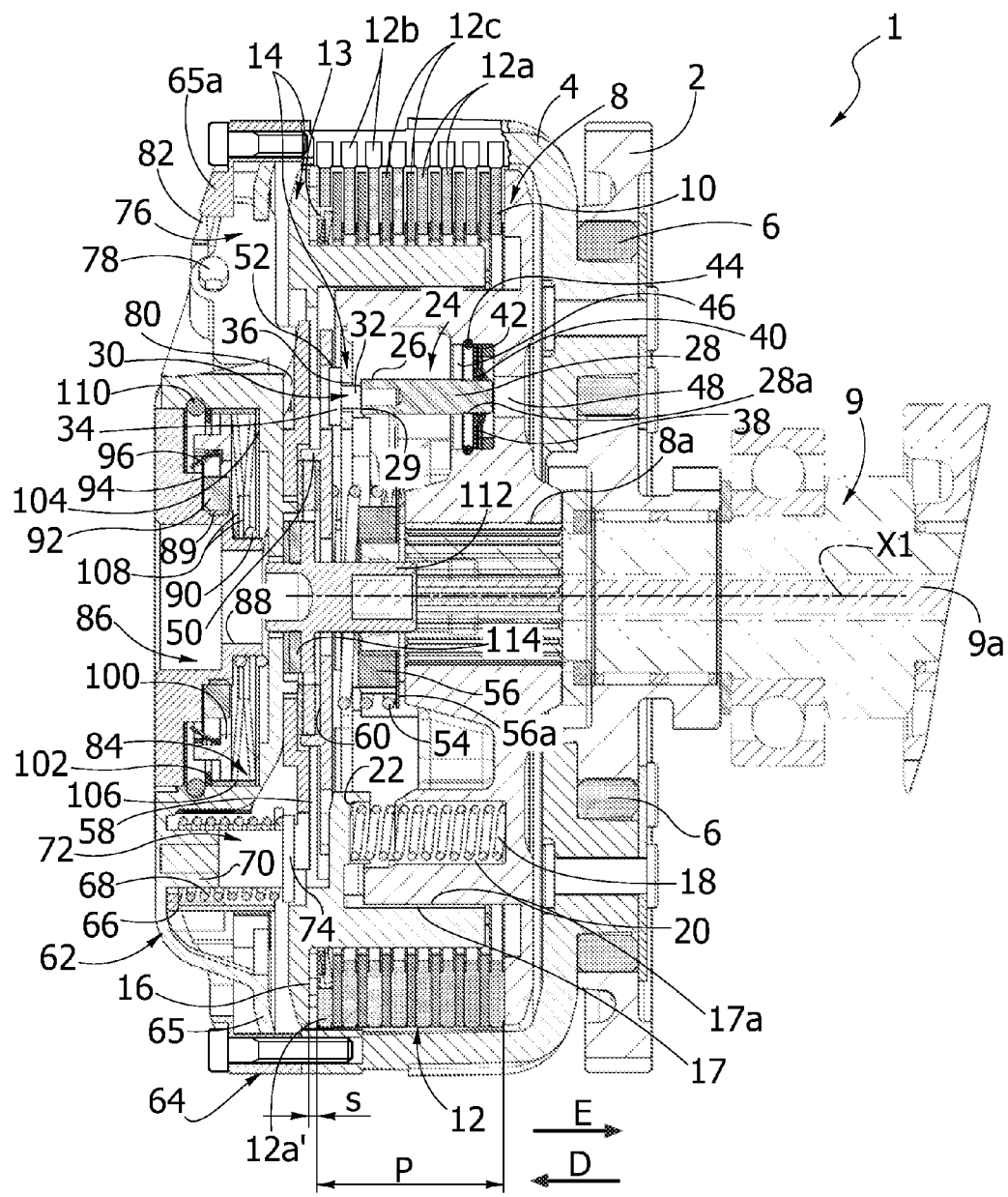
FIGS. 3, 4, 5 are views in longitudinal section of the clutch of FIG. 1 in the same conditions of wear and assembled with components manufactured with nominal dimensions, said figures illustrating a sequence of manual clutch engagement.
Figure 4:
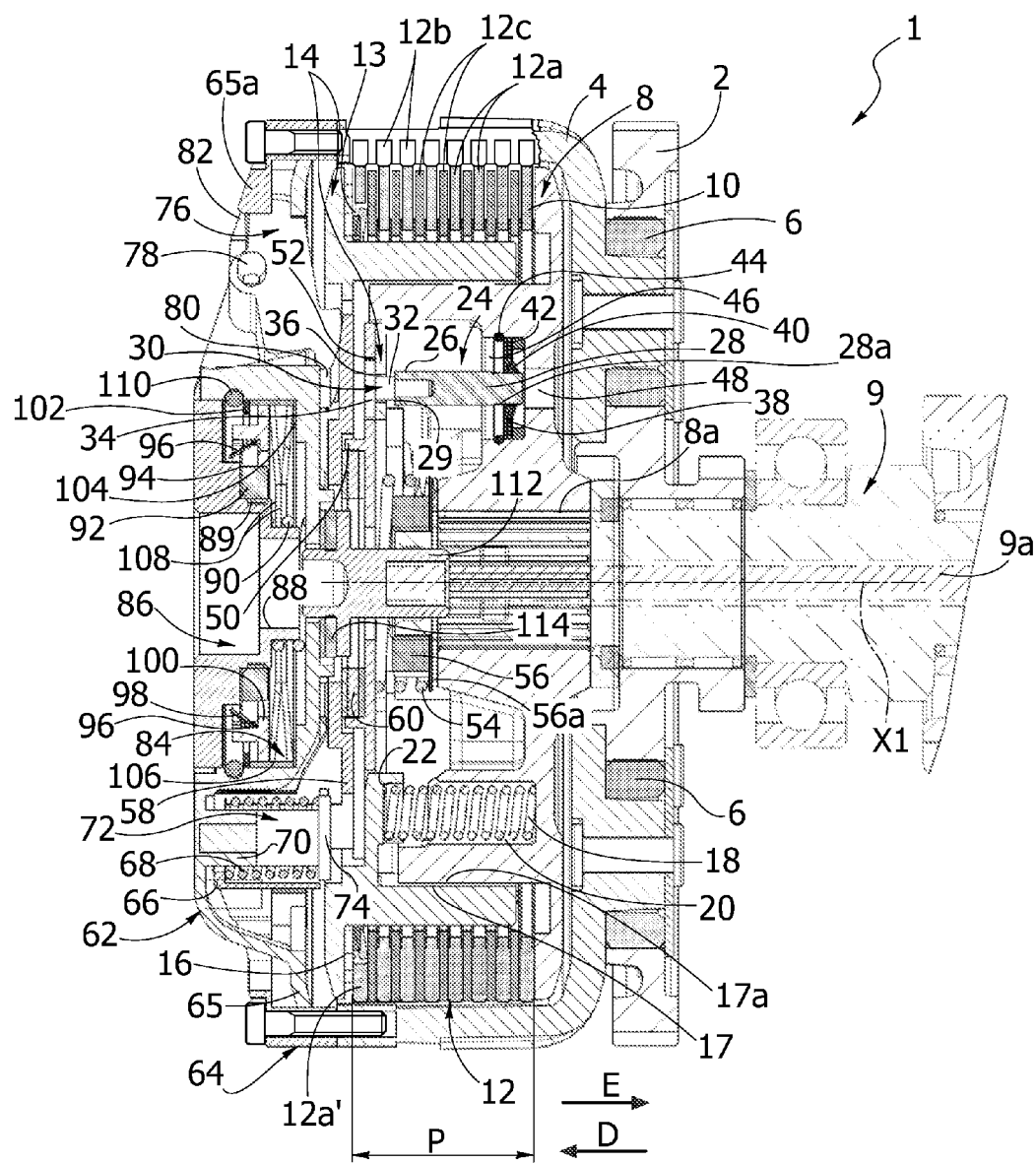
Figure 5:
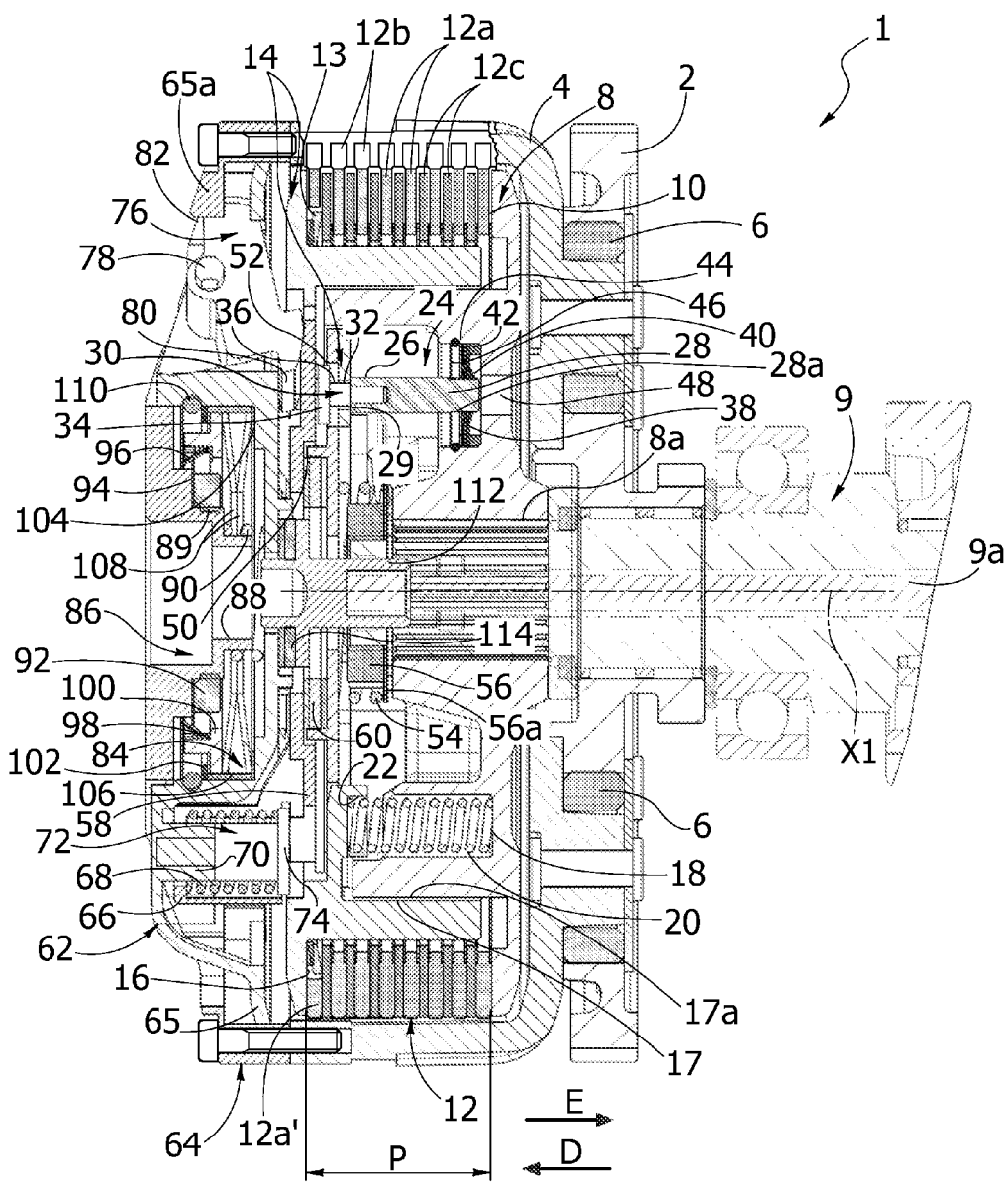

The clutch 1 can be moreover operated manually by means of, for example, a lever control of a known type positioned on a handlebar. FIGS. 3 to 5 illustrate a sequence of manual engagement of the clutch 1 corresponding to the starting from standstill of the vehicle.

With reference to FIG. 3, which corresponds to a condition in which the engine of the motor vehicle is idling, the driver, by means of an action on the aforesaid lever control, in itself known, causes the axial translation in the direction D of the control rod 9a, hence of the control element 112. Due to the axial bearing 114, the control element 112 axially pushes the centrifugal assembly in the direction D, and consequently all the elements integral therewith or coupled therewith. This hence causes an axial translation in the direction D by a length at most equal to S, nominal engagement stroke, of the mass carrier 62, of the centrifugal masses 76, and of the second pressure ring 58, coupled to the mass carrier by means of the slots 66, the pins 72, and the elastic elements 68.

The masses 76 remain in a resting condition because the speed of rotation is lower than the engagement threshold of the clutch 1. The first pressure ring 50 is moreover kept separate from the hub 14 and in contact with the bearing 60 due to the action of the elastic element 54.

As previously described, the axial translation of the mass carrier 62 and of the entire centrifugal assembly is possible thanks to an axial compression of the springs 108 that thus define a substantially constant load for the actuation of a control lever of the clutch during manual engagement of the clutch 1. Hence, the control element 112, which can be operated by means of the control rod 9a, is adapted to cause an axial translation, in particular in the direction D, of the centrifugal assembly, axially compressing the disc springs 108 and moving the centrifugal assembly away from the disk pack 12, thus preventing engagement of the clutch 1.

There is obtained in this way a considerable advantage from the standpoint of the response of the clutch 1 to the commands of the driver: as previously described, the force necessary for imparting a manual command on the clutch 1 is substantially constant, irrespective of the engine speed and equal to a value of preload of the disc springs 108 (neglecting a minor contribution due to the stiffness of the springs 108 during the manual disengagement stroke, in any case negligible given the typical values of the length S).

The subsequent FIG. 4 illustrates a condition in which the driver acts, keeping the control lever of the clutch pulled, on the accelerator command, causing an increase of the engine speed of rotation, hence of the clutch 1, beyond the threshold speed defined previously. In this way, the centrifugal masses 76 displace to reach the completely rotated position substantially corresponding to that of FIG. 2. Furthermore, the second pressure ring 58 and the mass carrier 62 are separated as a result of the action of the masses 76.

Due to the action of the elastic elements 54 and 18 the pressure assembly does not exert any axial action on the disk pack 12. This occurs, evidently, because the axial translation in the direction D of the centrifugal assembly has overridden the action of the masses 76 on the aforesaid elastic elements via the pressure assembly.

It should moreover be noted that the axially movable hub 14 and the first pressure ring 50 have, with respect to the pins 26, 30 of the device 24, the position illustrated in FIG. 1A. Also the collar 100, albeit having a different position with respect to the disks 102, 104 and to the ring 106, maintains the same position as the one illustrated in FIG. 1B with respect to the washer 94.

When a condition in which each mass 76 is completely rotated and is in contact with the corresponding endpoint boss 82 is reached (FIG. 4), it is possible to release the control lever of the clutch (FIG. 5), and thus cause the movement in the direction E of the control rod 9a and of the control element 112. In this way, an axial translation in the direction E of the centrifugal assembly is caused due to the release of the action of axial compression of the springs 108 and of the pressure assembly. In particular, there is caused an approach, with a law imposed by the driver, of the hub 14 towards the disk pack 12, which in turn causes the engagement of the clutch 1. Furthermore, since at the moment of release of the control lever by the driver the centrifugal masses 76 are completely rotated, they exert a thrust corresponding to the pre-loading of the springs 108 on the pressure assembly, which hence approaches to the disk pack 12 in well-defined conditions of thrust and of transmitted torque.

Finally, it should be noted that in FIG. 5, corresponding to a condition immediately subsequent to complete release of the control lever of the clutch by the driver, the springs 108 are minimally compressed in an axial direction to compensate, as has been described, for the difference between the displacement, which is imposed by the masses 76 to the hub 14, and the displacement that can effectively be performed by the hub 14 itself. FIG. 5 substantially illustrates a condition of complete engagement of the clutch 1. The condition illustrated in FIG. 5 can hence correspond, indifferently, to the completion of a sequence of manual engagement, such as the one illustrated in FIGS. 3, 4, or to completion of a sequence of automatic engagement, such as the one illustrated in FIG. 1;

namely, FIG. 5 shows the same condition as the one illustrated in FIG. 2, except for the position of the centrifugal masses 76, which in FIG. 5 are in contact with the corresponding endpoint bosses 82.

Figure 6:
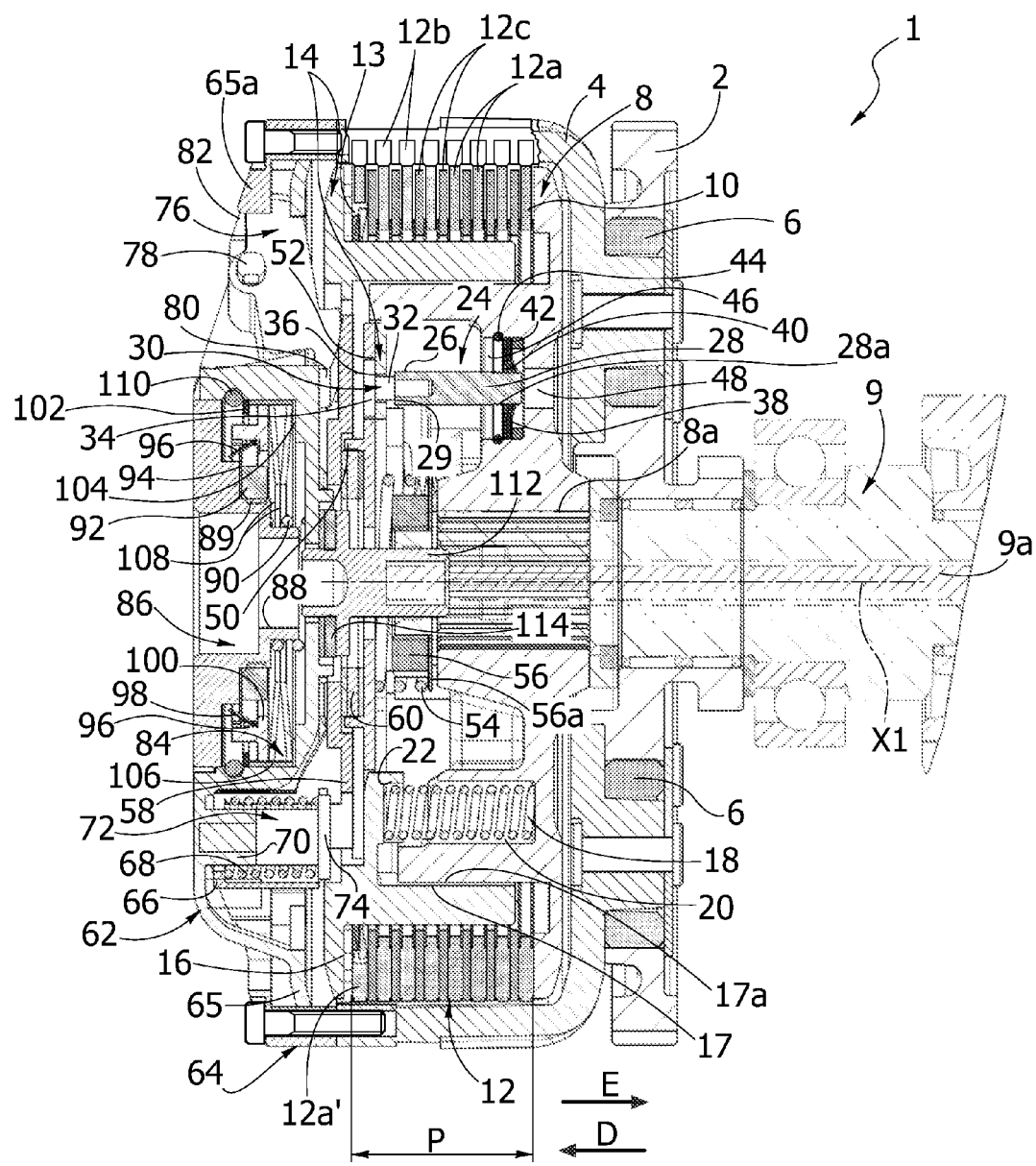
FIG. 6 is a view in longitudinal section of the clutch of FIG. 1 in the same conditions of wear and assembled with components manufactured with nominal dimensions, said figure illustrating an operation of manual clutch disengagement.

FIG. 6 illustrates the clutch 1 during an operation of manual disengagement. Starting from a condition of completely engaged clutch, for example illustrated in FIG. 5, the driver can operate the control lever and operate an axial translation in the direction D of the control rod 9 and of the control element 112. This causes, as described previously, a corresponding axial translation in the direction D, with compression of the disc springs 108, of the centrifugal assembly and of the pressure assembly, keeping the masses 76 in contact with the corresponding end point bosses 82. The action of compression on the disk pack 12 is consequently overridden and it is possible, for example, to select a different ratio of the gearbox. In general is in any case possible to manually disengage the clutch 1 already at speeds of rotation that are only slightly higher than the engagement threshold, whilst it is possible to engage the clutch 1 manually only when conditions of speeds higher than those for complete automatic clutch engagement are reached.

According to an advantageous aspect of the clutch 1, it is also possible to carry out an operation of gear-change without any need for manual operation of the clutch 1. According to what has been described previously, it is sufficient to reduce the torque delivered by the engine by acting on the control of the accelerator to values sufficiently low as to enable engagement of a different gear in conditions that are not structurally harmful for the gearbox.

Figure 7:
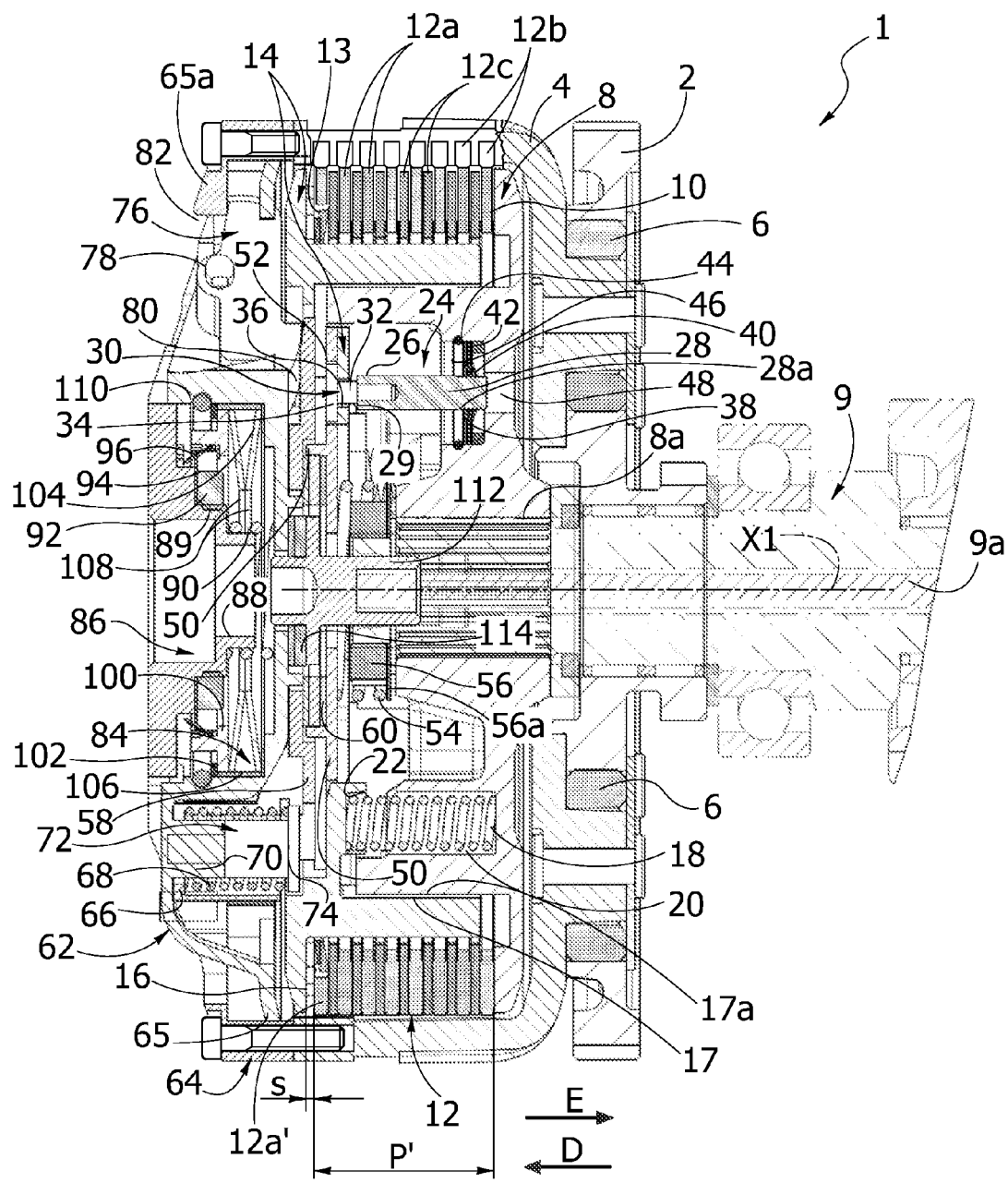
FIG. 7 is a view in longitudinal section corresponding to that of FIG. 1 but in a condition of non-zero wear and assembled with components manufactured with dimensional tolerances prescribed in the drawings.
Figure 8:
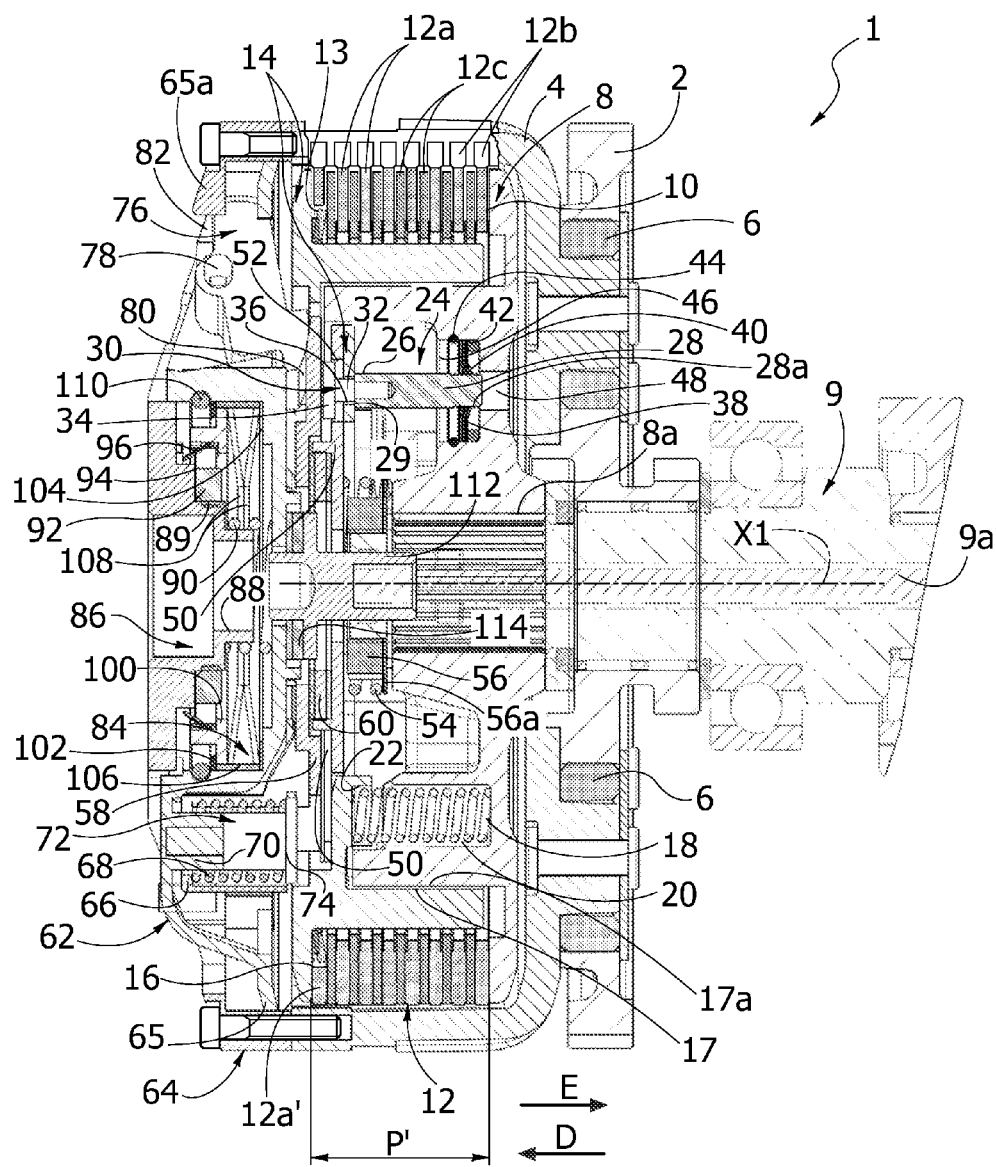
FIG. 8 is a view in longitudinal section corresponding to that of FIG. 2 but in the condition of wear and of assembly of FIG. 7.

The subsequent FIGS. 7, 8 illustrate the clutch 1 in conditions of operation similar to those of FIGS. 1, 2 but having the disk pack 12 partially worn or in the presence of the effect of the dimensional tolerances of the components of the clutch 1 at the time of their assembly and having an overall thickness P' (actual) smaller than the thickness P (nominal).

Figure 7A:
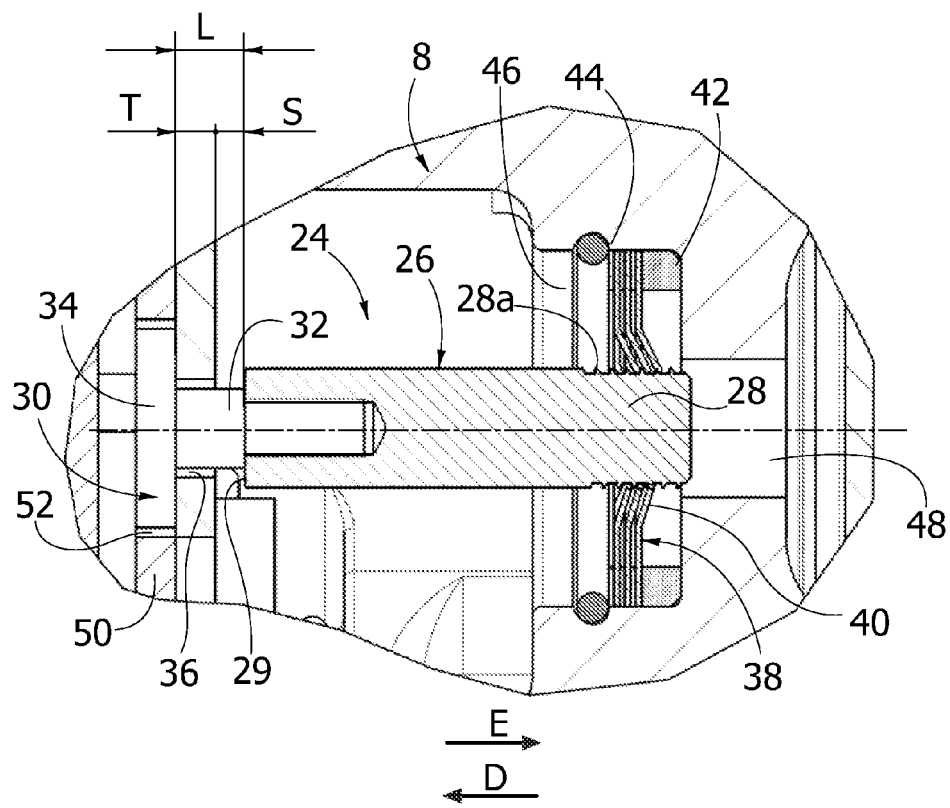
FIGS. 7A, 7B correspond to FIGS. 1A, 1B but refer to FIG. 7.
Figure 7B:
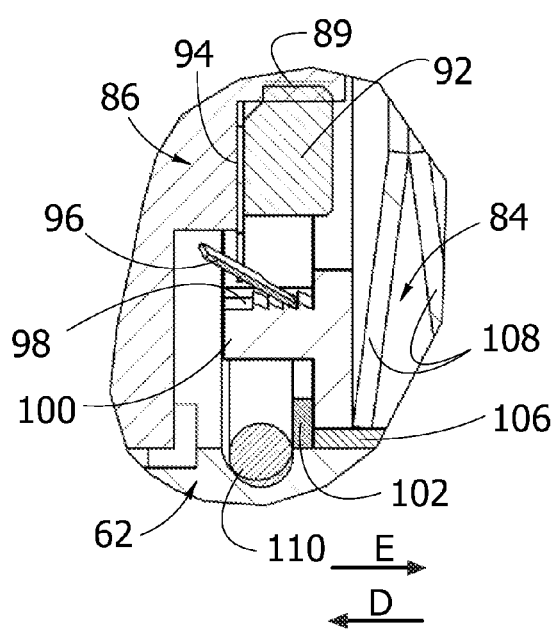

With reference to FIGS. 7, 7A, 7B the pressure assembly and the centrifugal assembly of the clutch 1 are displaced in the direction E with respect to the condition represented in FIGS. 1, 1A, 1B, respectively, by a distance equal to the pitch between two successive annular projections 28a provided on the end 29 of the pin 26 and by a distance equal to the pitch between two projections 98 provided on the collar 100. Conveniently the two pitches are chosen so as to substantially coincide.

Figure 8A:
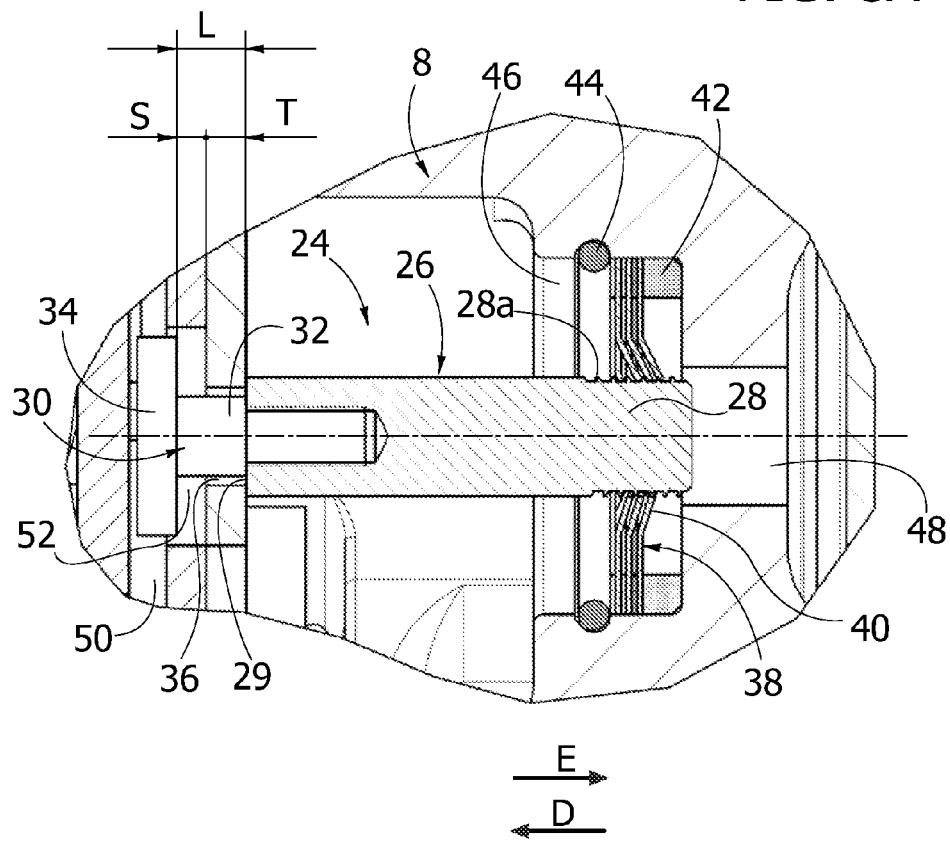
FIGS. 8A, 8B correspond to FIGS. 2A, 2B but refer to FIG. 8.
Figure 8B:
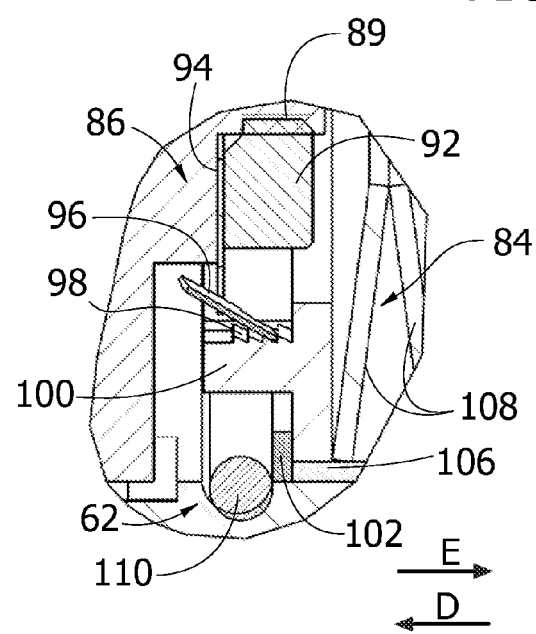

For a better understanding of the operation of the two clearance-recovery devices reference may be made to the subsequent FIGS. 8, 8A, 8B.

In FIG. 8 there is illustrated an operation of engagement with the disk pack 12 partially worn or in the presence of the effect of the dimensional tolerances of the components of the clutch 1 at the time of their assembly. The engagement stroke has, in this condition, an effective value that is equal to S increased by an amount equal to the difference between the thickness P of the disk pack 12 in conditions of zero wear and the thickness P' of the disk pack 12 worn.

However, as described previously, the axially movable hub 14 is substantially constrained to the axial movement between the heads 34 of the pins 30 and the ends 29 of the pins 26. Furthermore, the distance that separates the hub 14, in particular the portion with reduced thickness in which the clearance-recovery devices 24 are inserted, from the end 29 is fixed and equal to S.

During the engagement of the clutch 1 with disk pack 12 worn, the hub 14 covers the distance S without causing a compression of the disk pack 12, because, as said, the engagement stroke has an increased effective value. Nevertheless, it will be appreciated that at the time when the hub 14 is displaced in the direction E by a distance S, this is in contact with the ends 29 of the pins 26.

To be able to start engagement of the clutch 1, the pin 26 is pushed by the hub 14 within the annular laminas 38 in the direction E and partially within the channel 48. This is possible, as described, due to the geometry of the annular projections 28a provided on the end 28. Hence, the hub 14 performs an additional displacement, equal to the difference between the thicknesses P and P', in the direction E equal to the amount by which the nominal engagement stroke S has increased due to the wear.

The hub can perform the aforesaid additional displacement since, as described previously, each mass 76 can rotate by an angle greater than what would be necessary to cause a translation of the hub 14 just by the distance S. Hence, in this case, the action of the masses 76 is at first necessary for actuation of the first clearance-recovery device 24. From the foregoing description, it is clear that the first clearance-recovery device intervenes only when the clutch is in working conditions.

The first clearance-recovery device 24 hence assumes a position illustrated in FIG. 8A.

Consequently, the centrifugal assembly, the components coupled and/or integral therewith and the first and second pressure rings 50, 58 undergo a displacement in the direction E equal to the additional displacement of the hub 14.

Said displacement is produced by the second clearance-recovery device, in particular by the elastic element 90 when the engine and the clutch are stationary or else when the centrifugal masses 76 are in a resting position (see FIG. 1) due to the low engine speed. The additional displacement of the hub 14 momentarily overrides any axial action of contrast that normally maintains the centrifugal assembly in position against the action of the elastic element 90. It should be noted in fact that the operation of each first device 24 is of a discrete and substantially click-action type due to the geometry of the annular projections 28a. There remains only an axial action by the elastic element 54, but it is of a negligible amount as compared to the action produced by the elastic element 90 on account of the greater stiffness of the latter, as has been described previously.

Then the elastic element 90 moves the centrifugal assembly away from the hub 86 of the bell 64 causing a displacement thereof in the direction E equal to the additional displacement of the hub 14. Evidently, when the displacement of the centrifugal assembly and of the pressure assembly stops, an axial mechanical balance is re-established within the clutch 1, in particular at the interface between the first pressure ring and the hub 14.

As in the case of the first clearance-recovery device 1, the displacement is possible thanks to the profile of the projections 98 co-operating with the lips 96 of the washer 94, which permit a movement of the collar 100, and hence of the centrifugal assembly, of the springs 108, of the disks 102 and 104 and of the ring 106, only in the direction E.

Basically, the second clearance-recovery device is adapted to allow an axial movement of the centrifugal assembly only in the direction of the axially movable hub 14. Also the second clearance-recovery device has an operation of a discrete, substantially click-action, type due to the geometry of the annular projections 98. The second clearance-recovery device works only when the engine and the clutch are stationary or else when the masses 76 are in a resting position (see FIG. 1) due to low engine speed.

Finally, when the clutch 1 returns into the standby condition illustrated in FIG. 7, the first clearance-recovery device 24 limits the separation of the hub 14 from the hub 8 and from the disk pack 12. Following upon additional displacement of the hub 14 that has caused an axial advancement in the direction E of the pins 26, 30, the heads 34 are in a position which is axially translated in the direction E.

Since the heads 34 offer an abutment surface to the hub 14, it is evident that the hub 14 is axially withheld, against the action of the elastic elements 18, in a position translated in the direction E by an amount equal to the additional displacement performed thereby during the step of engagement due to the wear of the disk pack 12 and the dimensional tolerances of the components of the clutch 1 at the time of their assembly. This is possible because the pins 26, and consequently the pins 30 integral thereto, cannot move axially in the direction D due to, as described, the lips 40 co-operating with the annular projections 28a.

This means, with reference to FIGS. 7, 7A, that the hub 14 is in absolute terms closer to the hub 8, but the distance with respect to the worn disk pack 12 is brought substantially back to the value S, nominal engagement stroke in conditions of zero wear (and/or in an initial assembly condition). Hence the clutch 1 can operate in conditions similar to the ones corresponding to a zero wear of the disk pack 12 or else to the presence of components with nominal dimensions.

In fact the first clearance-recovery device 24 maintains the engagement stroke of the clutch 1, which, as described, is equal to the distance between the hub 14 and the disk pack 12 in conditions of disengaged clutch, substantially constant and equal to S. The second clearance-recovery device, when the clutch is stationary or else when the masses 76 are in a resting position (FIG. 1) due to the low engine speed of rotation, exerts an action of compensation of the position of the centrifugal assembly not simultaneous to the action of the first clearance-recovery device. In this way, the relative position of the centrifugal assembly, the pressure assembly, in particular the hub 14, and the disk pack 12 is substantially constant also in conditions of marked wear of the disk pack 12 itself (or else when components with actual dimensions different from the nominal ones due to the machining tolerances are installed).

The operation of the clutch 1 remains identical to what has been described previously, irrespective of the position of the clearance-recovery devices.

The clutch 1 herein described presents a series of considerable advantages, amongst which the most important is certainly that of presenting an operation substantially independent of the progressive wear of the disk pack 12 and of the dimensional tolerances of the various components upon installation. This reflects directly on the responses of the clutch 1 to the inputs of the driver and on the drivability of the vehicle itself.

Furthermore, the adaptation of the clutch 1 to the progressive wear of the disk pack 12 is completely automatic and transparent for the driver of the vehicle, thus rendering any intervention of adjustment on the clutch 1 superfluous in the period of service life of the disk pack 12. This has evidently a marked impact on the maintenance costs of the motor vehicle. Initial assembly of the clutch 1 may, in addition, be carried out without resorting to repeated measurements of the clearance to achieve optimal conditions of operation, since the two clearance-recovery devices compensate automatically for any clearance that would normally lead to a poor operation or lack of operation of the clutch 1. This evidently leads to a marked reduction in the costs. The same advantage may be encountered also in the normal operations of disassembly and reassembly of the clutch 1 during maintenance.

It is moreover possible to adapt the clutch 1 to different requirements that depend upon the specific application and upon the motor vehicle on which it is installed by varying the number and arrangement of the centrifugal masses 76 and/or the number and preloads of the various elastic elements. The springs, in fact, can be easily removed in part from the mass carrier 62 and subsequently reinstalled thereon, consequently varying the behaviour and performance of the clutch 1.

Nevertheless, it will be appreciated that further advantages of the clutch 1 include the possibility of exploiting manual operation thereof with a constant force required, which is equal to the value of preload of the disc springs 108.

Finally, it is possible to apply the first and second clearance-recovery devices also to clutches that are in part different from the clutch 1.

Figure 9:
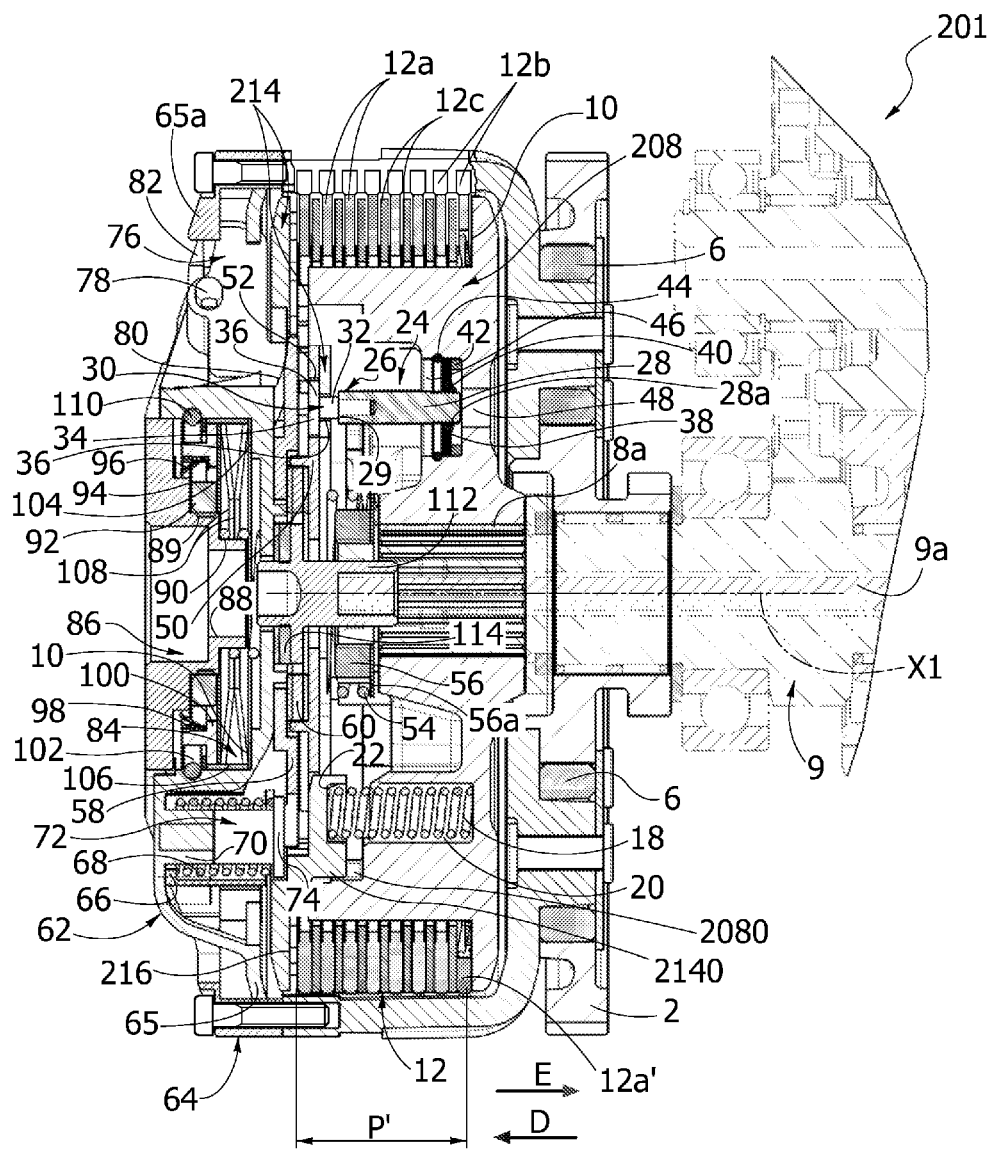
FIGS. 9 and 10 are views in longitudinal section of a clutch according to a second embodiment of the invention, in conditions of zero wear and assembled with components made with nominal dimensions, said figures illustrating a part of a sequence of automatic clutch engagement.
Figure 10:
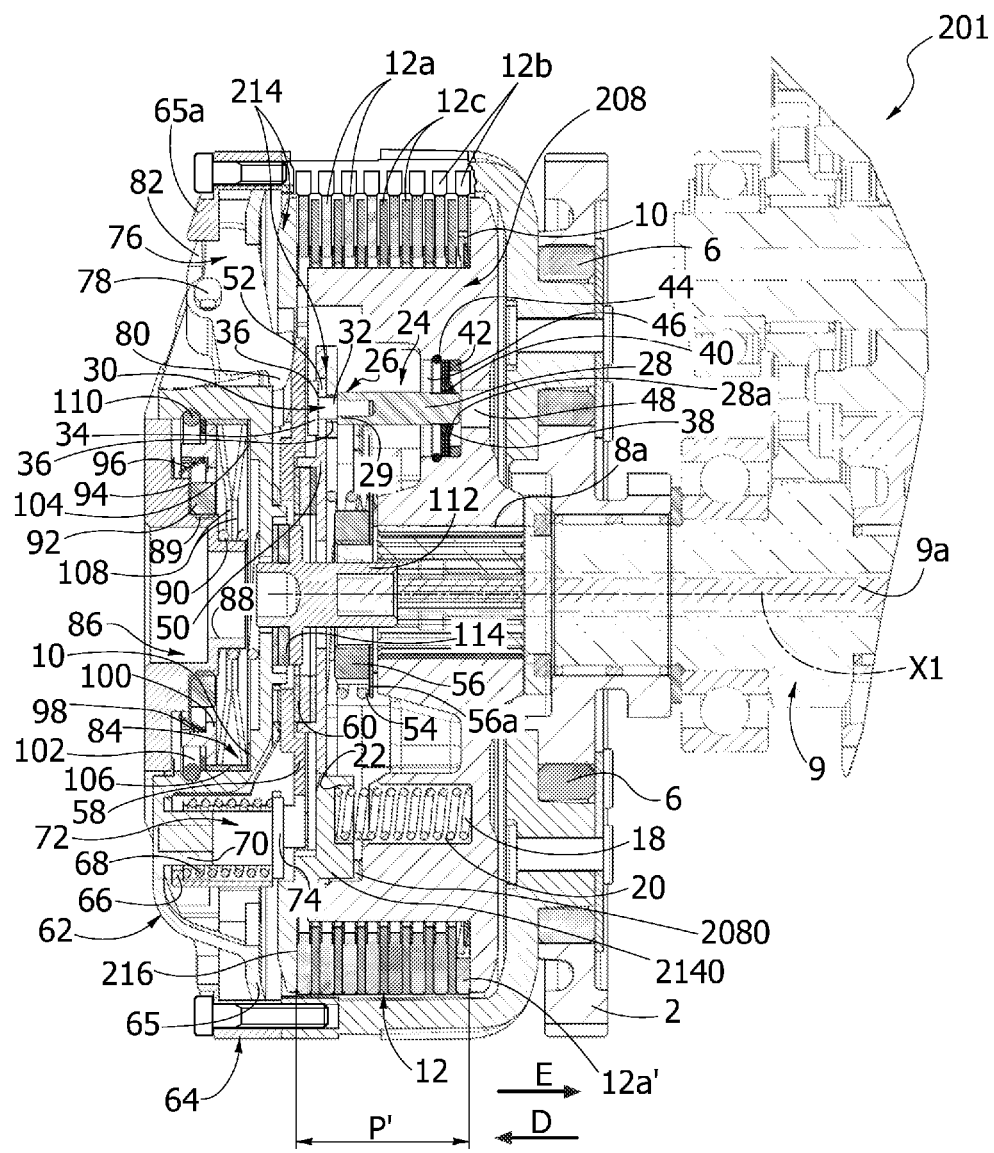

FIGS. 9, 10 illustrate a second embodiment 201 of a clutch according to the present invention. The operating conditions illustrated substantially correspond to those of FIGS. 1, 2, and thus show part of a sequence of automatic engagement.

The components that have the same reference numbers are identical to those of the clutch 1 and perform the same functions already described in regard to the clutch 1.

The clutch 201 differs from the clutch 1 in that it comprises an axially fixed hub 208, integral in rotation with the driven disks 12c, and a disk-pusher element that in this embodiment is a disk-pusher ring 214 axially movable and integral in rotation with the hub 208 by means of an external toothing 2140 coupled to and co-operating with an internal toothing 2080 of the hub 208, both having straight teeth. It is hence evident that, during transmission of torque, it is not possible to generate an additional axial force, as in the case of the clutch 1, on account of the geometry of the toothings 2080, 2140. Hence, the clutch 201 cannot benefit from the aforesaid "power torque" and consequently the centrifugal masses 76 of the clutch 201 must generate the entire axial load necessary for transmitting the torque of the engine to the primary shaft of the gear-change.

The driven disks 12c are integral in rotation with the hub 208 by means of an internal toothing.

The elastic elements 18, as has been described for the clutch 1, are designed to cause a separation of the disk-pusher ring 214 from the axially fixed hub 208 and are housed in coaxial slots 220, 222 provided, respectively, on the hub 208 and on the disk-pusher ring 214.

Each neck 32 of the pins 30 of the clearance-recovery devices 24 is inserted in a portion of the disk-pusher ring 214 and operates with modalities altogether identical to what has been described as regards the clutch 1. The disk-pusher ring 214 exerts an axial action that compresses the disk pack 12, enabling transmission of the torque to the hub 208 and to the driven shaft 9a.

The disk-pusher ring 214 axially co-operates with the first pressure ring 50, in a way altogether similar to the hub 14 of the clutch 1. Like the clutch 1, the clutch 201 comprises a pressure assembly including the first and second pressure rings 50, 58 and the disk-pusher ring 214.

Operation of the clutch 201 is identical to that of the clutch 1; consequently it will not be described again. The clutch 201 is hence able to perform an automatic engagement, offers the possibility of carrying out operations of manual engagement and disengagement with constant actuation force thanks to the presence of the pair of disc springs 108, which moreover act as a limiting member for the transmissible torque, as described for the clutch 1. However, the actuation force requested to the driver of the vehicle is greater, approximately twice as much, than what is required by the clutch 1 due to the absence of helical coupling profiles between the ring-pusher disk 214 and the hub 208, hence due to the impossibility of generating an additional axial force for the compression of the disk pack 12. This evidently imposes a sizing of the springs 108 with a higher preload.

Also the clutch 201 is able to adapt to the progressive wear of the disk pack automatically and in a way that is completely transparent for the driver thanks to the presence and to the action of the first and second clearance-recovery devices, which are identical to what has been described for the clutch 1.

Finally, it is to be noted that what has been described herein applies indifferently in the case where the clutches 1, 201 are of the dry type or oil-bath type.

While the foregoing is directed to embodiments of the present invention, other and further embodiments of the invention may be devised without departing from the basic scope thereof, and the scope thereof is determined by the claims that follow.

The invention claimed is:

1. A clutch, adapted to transmit motion from a driving shaft to a driven shaft, having an axis of rotation coaxial to said driven shaft and comprising:
    a ring gear, adapted to receive the motion from said driving shaft and coaxial to said axis of rotation;
    a first bell integral in rotation with said ring gear and coaxial to said axis of rotation;
    an axially fixed hub internal to said first bell and coaxial to said axis of rotation, said hub being adapted to be connected in rotation to said driven shaft;
    a pressure assembly, axially movable, including a disk-pusher element,
    a disk pack, including a plurality of driving disks integral in rotation with respect to said first bell alternated with a plurality of driven disks, said disk pack being coaxial to said axis of rotation and being comprised between said axially fixed hub and said disk-pusher element,
    a plurality of elastic elements, designed to cause a separation of said disk-pusher element from said axially fixed hub and from said disk pack; and
    a centrifugal assembly, including a mass carrier and a plurality of centrifugal masses, said centrifugal assembly being coaxial to said axis of rotation and being integral in rotation with a second bell, said second bell being moreover integral in rotation with said first bell, said centrifugal assembly being axially co-operating with said pressure assembly to cause an axial compression of said disk pack,
    at least one first clearance-recovery device of a unidirectional type, adapted to limit the separation of said disk-pusher element from said axially fixed hub and from said disk pack, and
    a second clearance-recovery device of a unidirectional type, adapted to permit an axial movement of said centrifugal assembly only towards said disk-pusher element.

2. The clutch according to claim 1, wherein said first clearance-recovery device comprises a first pin and a second pin, coaxial and integral to said first pin, said first pin having a first end, provided with annular projections, inserted in a pack of annular laminas, which are axially fixed and each have at least one bent-back lip, said annular projections being adapted to co-operate with said at least one bent-back lip.

3. The clutch according to claim 2, wherein said second pin of said first clearance-recovery device comprises a neck and a cylindrical head, said neck having a smaller diameter than that of said cylindrical head and that of said first pin.

4. The clutch according to claim 3, wherein said neck is inserted in a hole provided in a portion of said disk-pusher element.

5. The clutch according to claim 4, wherein said neck has a length substantially equal to the sum of the thickness of said portion of disk-pusher element and of the axial distance, in a condition of disengaged clutch, between said disk pack in conditions of zero assembly clearance and wear and said disk-pusher element.

6. The clutch according to claim 5, wherein said disk-pusher element is a hub axially movable and integral in rotation with said axially fixed hub, said hub which is axially movable being integral in rotation with respect to said driven disks.

7. The clutch according to claim 6, wherein said hub which is axially movable is axially fitted on said axially fixed hub by means of a plurality of helical coupling profiles co-operating with corresponding helical coupling profiles provided on said axially fixed hub.

8. The clutch according to claim 5, wherein said disk-pusher element is a disk-pusher ring axially movable and integral in rotation with said axially fixed hub.

9. The clutch according to claim 8, wherein said disk-pusher ring is integral in rotation with respect to said axially fixed hub by means of an external toothing, which is coupled to and co-operates with a corresponding internal toothing of said axially fixed hub, said external toothing and internal toothing (2080) having straight teeth.

10. The clutch according to claim 2, wherein said annular projections have a sawtooth profile.

11. The clutch according to claim 1, wherein said second clearance-recovery device comprises an elastic element, adapted to move said centrifugal assembly axially away from a hub of said second bell, a threaded ringnut, a washer, having a plurality of bent-back lips and axially blocked by said ringnut on said hub of said second bell, and a collar having a plurality of annular projections, adapted to co-operate with said bent-back lips of said washer, said collar being axially countered by a pair of disc springs, said collar and said pair of disc springs being comprised in an annular structure defined by a first disk and a second disk, which are mutually parallel and have a substantially planar development, and by a ring, having a substantially axial development, set between said first and second disks.

12. The clutch according to claim 11, wherein said annular structure is housed in a circular seat coaxial to said axis of rotation and provided in said mass carrier.

13. The clutch according to claim 11, comprising a control element axially co-operating with said mass carrier and adapted to cause an axial translation of said centrifugal assembly by axially compressing said disc springs and moving said centrifugal assembly away from said disk pack, said control element being operable by means of an axially movable control rod.

14. The clutch according to claim 1, wherein said pressure assembly moreover comprises a first pressure ring and a second pressure ring axially co-operating by means of an axial bearing and which are coaxial to said axis of rotation, said second pressure ring being arranged for receiving an axial thrust from said centrifugal masses, and said first pressure ring being designed to transfer said axial thrust to said disk-pusher element.

15. The clutch according to claim 14, wherein said second pressure ring is integral in rotation with said centrifugal assembly by means of a plurality of through axial seats, provided in said second pressure ring, in which corresponding axial projections of said mass carrier are inserted, said through axial seats moreover housing a respective elastic element, adapted to produce an elastic return of said second pressure ring towards said mass carrier.

* * * * *